Dec. 14, 1965 R. J. TREWELLA 3,223,567
METHODS OF MAKING A NON-ADHERENT DRESSING
Original Filed Feb. 19, 1959 4 Sheets-Sheet 1

INVENTOR.
ROBERT J. TREWELLA

Dec. 14, 1965   R. J. TREWELLA   3,223,567
METHODS OF MAKING A NON-ADHERENT DRESSING
Original Filed Feb. 19, 1959   4 Sheets-Sheet 2

INVENTOR.
ROBERT J. TREWELLA

Dec. 14, 1965   R. J. TREWELLA   3,223,567
METHODS OF MAKING A NON-ADHERENT DRESSING
Original Filed Feb. 19, 1959   4 Sheets-Sheet 3

INVENTOR.
ROBERT J. TREWELLA

United States Patent Office 3,223,567
Patented Dec. 14, 1965

3,223,567
METHODS OF MAKING A NON-ADHERENT DRESSING
Robert J. Trewella, Milltown, N.J., assignor to Johnson & Johnson, a corporation of New Jersey
Original application Feb. 19, 1959, Ser. No. 794,416, now Patent No. 3,077,882, dated Feb. 19, 1963. Divided and this application Apr. 10, 1962, Ser. No. 192,614
10 Claims. (Cl. 156—253)

This is a division of application Serial No. 794,416, filed Feb. 19, 1959, now Patent No. 3,077,882.

The present invention relates to absorbent materials and more particularly to surgical and other absorbent dressings used for the protection and treatment of wounds or other bodily injuries. More specifically, the present invention is directed to absorbent dressings wherein the surface adapted to face and directly contact the wound is formed of a perforated, smooth, non-adherent flexible film, and to methods of making the same.

During the natural healing of wounds and other bodily injuries, the absorbent dressing applied thereto generally protects the injured area from infection, contamination, and the like. During this natural healing process, however, there are fluid secretions from the wound which flow outwardly into the absorbent dressing. These fluid secretions gradually harden and form a dry crust or scab which covers the wound. During this hardening process, the fibrous materials forming the absorbent dressing become embedded in the crust or scab and become substantially an integral part therein. Consequently, when it is desired to redress the wound and apply a fresh dressing, the removal of the old dressing usually results in the tearing loose of the crust or scab which causes considerable pain and discomfort to the patient, as well as reopening the wound, starting the fluid secretions again, and, in general, delaying and endangering the healing process.

It has been proposed to use absorptive dressings wherein the surface adapted to contact the wound is formed of a smooth, lubricous flexible film which does not adhere to the crust or scab formed on the wound. Such non-adherent films are normally perforated so that the fluid secretions can pass therethrough to be absorbed in absorptive materials on the outer side of the film. As a consequence, when it is desired to redress a wound protected by such a dressing, the removal of the old dressing is facilitated by the fact that the crust or scab does not adhere to to the smooth, flexible film. Any secretion which enters the perforations and hardens to form small pillar-like connecting links between the crust or scab itself and the secretions in the absorptive backing beyond the smooth, flexible film are weak and are easily ruptured without materially affecting the main crust or scab. Such absorptive dressings comprising perforated, smooth, flexible films and absorptive backings have found excellent commercial success.

It has been found, however, particularly when the perforations in the non-adherent film are relatively large, that stray ends of the fibrous materials in the absorptive backing tend to work through the perforations and become embedded in the crust or scab which is formed directly on the wound. As a result, the adherence between the crust or scab and the absorptive dressing is increased so that the possibility of the tearing loose of the crust or scab is also increased during redressing of the wound. This, of course, is undesirable, as pointed out previously.

It has therefore been proposed to provide spacing elements to separate the non-adherent film from the fibrous absorptive backing by a greater distance to prevent fibers from working through the perforations in the film. Spacing elements such as relatively non-adherent fabrics made from monofilaments or continuous filaments in the form of relatively openly-fabricated nature, for example, low count gauze (20 x 12 and lower), loosely knitted fabrics, sheets of individual threads, and the like, have been proposed.

In all of these prior spacing elements, however, there has been a problem of registry of the openings therein with the perforations in the non-adherent film and precise registry has normally been well-nigh impossible. Consequently, many threads of the spacer elements have extended directly across the perforations in the non-adherent film. As a consequence, the possibility of the crust or scab growing around the threads is still present which, of course, is undesirable.

Other types of spacing means have also been tried. For example, it has been proposed to simultaneously punch perforations in the non-adherent film and the fibrous spacing sheet or the absorptive backing itself. This will align the perforations in the non-adherent film with the openings in the spacing sheet or the absorptive backing. However, the punching operation cuts the fibers in the spacing sheet and the absorptive backing whereby many fibers of short length are formed, particularly near the punched openings. Such shorter fibers can naturally more easily sift through the openings in the non-adherent film and, again, undesirable features are present. Additionally, such punching operations are commercially undesirable as uneconomical, expensive and wasteful of materials and as introducing machine maintenance problems in die sharpness and tool drag, and the like.

It has now been discovered that, if a spacing element such as a fibrous web or sheet, the individual fibers of which are capable of movements under the influence of an applied fluid force, is positioned on a perforated, non-adherent film and a fluid is directed through the perforations in the non-adherent film and through the fibrous web, the fibers of the fibrous web are rearranged to provide openings which are in substantially complete registry with the perforations of the non-adherent film, leaving them clear and unblocked. This fluid rearrangement of the fibers of the fibrous web does not cut or shorten the rearranged fibers in any way and, therefore, the individual fibers immediately adjacent the openings in the fibrous web have substantially the same average length as the other fibers in other portions of the fibrous web. The fiber rearrangement procedures employed to make the absorbent dressings and other laminated structures of the present invention in accordance with the method of the present invention is known and is disclosed in U.S. Patent 2,862,251, issued December 2, 1958 to F. Kalwaites. Reference is specifically made to FIGURES 47 and 48 therein to illustrate a rearranged fibrous product which in the present invention is used as the spacing element between the perforated, non-adherent film and the absorbent backing.

After the fibers in the spacing sheet have been rearranged while positioned on the perforated film, as described, the absorptive backing is applied to the rearranged fibrous spacing element, whereby the complete absorptive dressing is formed with the perforated, non-adherent film spaced from the absorptive backing by the thickness of the fibrous spacing element. In the resulting absorbent dressing, the rearranged fibers of the spacing element are packed together into interconnected bundles of fibers having a pattern corresponding to the pattern of the openings therein. These openings are in substantial registry or alignment with the perforations in the non-adherent film and with very few, if any, spacing element fibers extending across the perforations or openings in the film.

The non-adherent film which is used to directly contact the wound may be selected from a large group of smooth, flexible, water-insoluble films. Synthetic plastic films are preferred, with "Mylar" and "Melinex" (polyethylene terephthalate polyesters) being an example, due to their excellent flexibility, good resistance to steam sterilization temperatures, good strength, low elongation, and other advantageous properties. Any film, however, may be used provided it is sufficiently flexible, insoluble in water, substantially inert to wound secretions, harmless to the wound, and capable of adapting itself to the surface conformity of the wound.

Other film materials which have been succesfully used as the perforated, non-adherent film of the invention are films of polyethylene such as high, medium and low density polyethylene and irradiated polyethylene; vinyl polymeric films such as polyvinyl chloride, polyvinyl chloride - polyvinyl acetate copolymers, polyvinylidene chloride-polyvinyl chloride copolymers, and polyvinylidene chloride; cellulosic films such as cellulose acetate, cellulose triacetate, cellulose acetate butyrate, and ethyl cellulose; polyamide films such as nylon 6 (polycaprolactam), nylon 6/6 (hexamethylene-diamine-adipic acid) and nylon 6/10 (hexamethylene-diamine-sebacic acid); and other materials such as plain parchment paper, metallic foil, and the like. These "other materials" are equivalents to the synthetic, resinous films in the products of the invention. The word "film" as used in the specification and claims is intended to include these "other materials" and like smooth-sheet materials which will not adhere to the crust or scab normally formed on a wound.

Careful consideration should be given to the resistance to heat and softening characteristics of the films used in accordance with the invention, with special regard to the temperature conditions of their further processing and ultimate use. Where high temperature sterilization is used, for example, such will, of course, be an additional prerequisite to be considered.

The film should be quite thin, with film thicknesses of from about 0.0001 inch (1/10 mil) to about 0.005 inch (5 mils) being preferred. There is no limit to the thinness or thickness of the film except as dictated by strength and flexibility requirements. In cases where flexibility and conformability are not important, film thicknesses up to 0.010 inch (10 mils) or more may be used.

The perforations in the film materials may have a wide variety of sizes and shapes, such as circular, square, diamond, etc. Circular perforations are preferred. Openings having a diameter as small as 1/32 inch or less to as large as ¼ inch or more may be used. As few as about 4 perforations per square inch to as many as 250 perforations per square inch may be used. It is to be appreciated that, when perforations of a large size, say ¼ inch, are employed, the resulting product finds other uses where such larger perforations permit greater access of fluids. The perforations may be arranged in aligned rows or offset, staggered rows or in any desired pattern. These perforations are made in the non-adherent film before the fibrous web or layer is positioned thereon and rearranged to form the desired spacer element.

One surface of the film is given a light coating with a water-insoluble, thermoplastic adhesive material which is allowed to dry before contact with the fibrous web. Such an adhesive is normally not tacky at room temperatures, whereby the fibrous web or layer may be easily laid down on the coated surface of the film. Passage through a heating means may then be employed to render the adhesive sufficiently tacky to adhere the fibers of the web thereto. This adherence should not be so strong that it will resist the rearranging force of the subsequent fluid treatment but it should be strong enough that the fibers are not completely torn loose by the fluid forces.

Various water-insoluble, thermoplastic adhesives may be used, such as cellulosic materials including cellulose acetate and cellulose acetate butyrate; acrylates and methacrylates, notably isobutyl, ethyl and methyl methacrylate; polyamide adhesives; vinyl resins such as vinyl chloride, vinyl acetal and vinyl butyral; polyvinyl acetate; polystyrene; natural product-based adhesives, such as rosin, substituted rosins, coumarone-indene resins, phenol modified coumarone-indene resins; hydrocarbon-based adhesives such as polyethylene, polypropylene and polyisobutylene; polyesters such as polyethylene terephthalate; etc.

The amount of adhesive applied to the surface of the film may be varied from about 1 pound of adhesive per 3000 square feet of film to about 15 pounds of adhesive per 3000 square feet of film, depending upon the nature and properties of the adhesive, the film and the nature and amount of the fibers to be adhered; etc. Within the more commercial aspects of the present invention, from about 1½ to about 10 pounds of adhesive per 3000 square feet of film is preferred. Such an amount satisfactorily bonds the fibrous web to the film and does not interfere with the subsequent fluid rearranging processes. It is to be observed that the fibers are bonded to the film but are free where they extend over the perforations in the film, prior to the application of fluid forces to the fibrous assemblage to effect fluid rearrangement of the fibers.

The softening or sticking temperature of the water-insoluble thermoplastic adhesive is desirably sufficiently low so that its potential adhesive nature can be developed without adversely affecting the film upon which it is coated. For this purpose, therefore, a careful selection of the film and the adhesive should be made in order that passage through the adhesive-developing zone does not undesirably affect or damage the film.

In the event that the theromplastic nature of the flexible film is such that it, itself, can be sufficiently heated to develop enough tackiness, the inherent adhesivity of the film can be used to adhere the fibrous web thereto. Such would therefore eliminate the necessity for employing the water-insoluble, thermoplastic adhesive agent.

The fibrous web or other fibrous starting material, the individual fibers of which are capable of movement under the influence of an applied fluid force, which is processed to form the spacing element of this invention may be produced by carding, garnetting, air deposition, fluid paper-making techniques, or the like. Carding is the preferred method inasumch as it yields the most highly oriented and aligned arrangement of fibers in the spacing element.

The present invention will be described primarily with reference to fibrous webs produced by carding but it is to be understood that this is primarily for illustrative purposes and is not to be construed as limitative of the present invention.

The webs produced by carding may contain textile fibers of various lengths, say, from about one-half inch in length to about two and one-half inches or more in length, as well as mixtures thereof. Various types of textile fibers may be used, for example: natural vegetable and animal fibers such as cotton, silk, wool, vicuna, mohair, alpaca, flax, ramie, jute, abaca, etc; the synthetic or man-made fibers such the cellulosic fibers, notably cuprammonium, viscose or regenerated cellulose fibers; cross-linked cellulosic fibers such as "Corval" and "Topel"; cellulose ester fibers, for example, cellulose acetate such as "Celanese" and cellulose triacetate such as "Arnel"; the saponified cellulose ester fibers such as "Fortisan" and "Fortisan-36"; the polyamide fibers such as nlyon 6 (polycaprolactam), nylon 6/6 (hexamethylene-diamine-adipic acid), nylon 6/10 (hexamethylene-diamine-sebacic acid), nylon 11 (11-amino-undecanoic acid—"Rilsan"); protein fibers such as "Vicara"; halogenated hydrocarbon fibers such as "Teflon" (polytetrafluoroethylene); hydrocarbon fibers such polyethylene, polypropylene and polyisobutylene; polyester fibers such as "Dacron"; vinyl fibers such as "Vinyon" and "Saran"; dinitrile fibers such as "Darvan"; nitrile fibers such as "Zefran"; acrylic fibers such as "Dynel," "Verel," "Orlon," "Acrilan," "Creslan," etc.; mineral fibers such as glass; etc. Again, the softening and sticking temperatures of these fibers, as well as other physical characteristics and properties, notably absorbency, must be considered in the selection of a particular fiber for a particular use. For example, mineral fibers, such as glass fibers, would generally be avoided in some uses as non-adherent surgical dressings.

The denier of the individual synthetic fibers referred to above is preferably in the range of the approximate thickness of the natural fibers mentioned and consequently deniers in the range of from about 1 to about 5 are preferred. However, where greater covering power is desired, deniers of down to about ¾ or even about ½ may be employed. Where greater bulk and loft are desired, deniers of up to about 5.5, 6, 8, 10, 15, or higher, are suitable. The minimum and maximum denier would, of course, be dictated by the desires or requirements for a particular fibrous web, and by the machines and methods for producing the same.

If desired, the fibrous web may include a minor proportion, less than 50% by weight and preferably less than about 25% by weight, of fibers other than those of textile length. These may be fibers such as papermaking fibers, for example, which extend down to about one-eighth of an inch in length or less. These shorter fibers normally cannot be used in conventional carding operations and must be included by other methods, as is known.

Illustrative of the shorter length fibers which may be employed are the natural cellulosic fibers such as papermaking woodpulp and wood fibers and cotton linters, or any of the hereinabove-mentioned fibers, if in lengths of less than one-half inch and down to about one-eighth inch or less. Such short fibers, however, are not advisable where the shortness of their length could create disadvantages, if they were to break loose.

It is preferred that the shorter papermaking fibers be unbeaten or substantially unhydrated, if a flexible material is desired as the end product. In this connection, shorter hydrated fibers of woodpulp in a papermaking length, for instance, may be mixed with longer fibers in such a way that the longer fibers will contribute the strength desired in the resulting material while the shorter wood fibers will decrease its cost.

The weight of the fibrous web or layer may be varied within relatively wide limits depending upon the requirements of the finished product. A thin web of fibers, such as produced by a card, may have a weight of from about 35 to about 95 grains per square yard. Such a thin fibrous web, however, is so fragile that its handling and manipulation is extremely difficult. In the usual case, therefore, from about 3 to about 12 or more of these webs are combined and processed in the combined form. In instances where products having a greater weight are desired, total web weights of as high as about 1600 or 2000 grains or more per square yard may be processed. Within the more commercial aspects of the present invention, however, web weights of from about 150 grains per square yard to about 750 grains per square yard are contemplated.

The treating fluid which is used to rearrange the fibers in the web in the method of this invention is preferably water, but it may be air, gas or other fluid. The treating fluid may contain materials which it is desired to incorporate in the rearranged fibrous material. For example, the treating liquid may be an aqueous liquor containing a dye or pigment, a wet-strength agent, an antibiotic, a bactericide or germicide, a disinfectant, etc.

If desired, and particularly where the fiber selected is hydrophobic, the water used in the hydraulic rearrangement may be heated to facilitate fiber relaxation and rearrangement. Liquids other than water may also be used, either alone or with the water, to facilitate fiber relaxation or simply to modify the wetting action of the water upon the fibers for the purpose of changing the fiber lubricity to thereby facilitate rearrangement by fluid forces.

In the following specification and the accompanying drawings, I have described and illustrated preferred embodiments of the products, methods and apparatus of the present invention but it is to be understood that the invention is not to be considered as limited to the specific embodiments disclosed, except as determined by the scope of the appended claims. With reference to the accompanying drawings:

Figure 1:
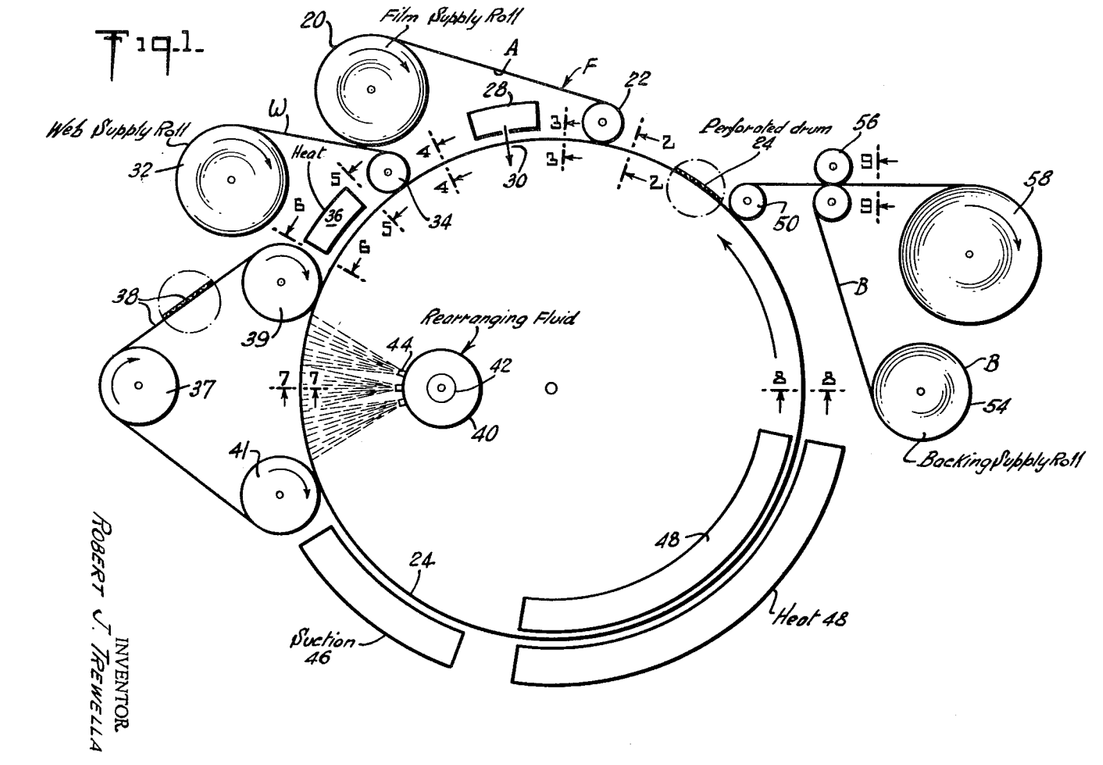
FIGURE 1 is a diagrammatic showing in elevation of a preferred embodiment of a method and apparatus for producing the products of the present invention.
Figure 2:
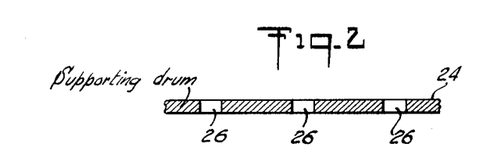
FIGURE 2 is a fragmentary cross-section of a portion of the supporting drum, taken in the direction indicated on line 2—2 of FIGURE 1 and showing the apertures formed in the supporting drum.
Figure 3:
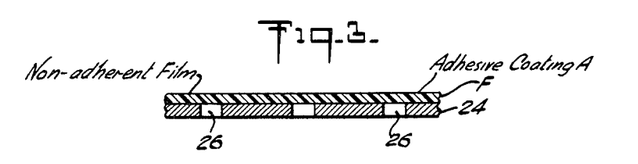
FIGURE 3 is a fragmentary cross-section of a portion of the supporting drum, taken in the direction indicated on line 3—3 of FIGURE 1 and showing the nonadherent film in position on the supporting drum.

In the embodiment of the invention shown in the drawings, a preferred method and apparatus for producing the products of the present invention is shown in FIGURE 1. In this figure, a supply roll 20 of a non-adherent film F suitable for the purposes of the present invention is provided. The film F is precoated on the underside thereof with a suitable water-insoluble, thermoplastic adhesive A and is drawn under tension from the supply roll 20 over a rotatable guide roll 22 to be positioned on a rotatable, supporting drum 24. A brake or other tensioning means may be provided for roll 20 whereby the desired tension may be applied to the film F. As shown in FIGURE 2, the supporting drum 24 is provided with apertures 26 in the peripheral surface thereof. These apertures 26 may take any size, shape or arrangement, as desired or required. The shapes, ararngements and sizes of openings 26 may be as described in the aforementioned Kalwaites Patent 2,862,251. The positioning of the non-adherent film F on the supporting drum 24 with the adhesively-coated side up is illustrated in FIGURE 3.

Figure 4:
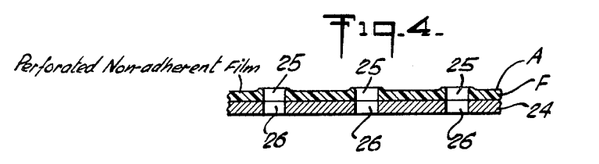
FIGURE 4 is a fragmentary cross-section of a portion of the supporting drum, taken in the direction indicated on the line 4—4 of FIGURE 1 and showing the perforations formed in the non-adherent film.

The supporting drum 24 rotates in a counterclockwise direction, as viewed in FIGURE 1, and carries the non-adherent film F in close, intimate contact therewith under a punching or perforating device capable of forming perforations 25 in the film in registry with the apertures 26 in the supporting drum 24, as illustrated in FIGURE 4. Any desirable form of punching or perforating device may be used. The one shown and preferred is a hot air system 28 using heated air 30 issuing in a thin stream through a thin orifice, such as described in commonly assigned, co-pending U.S. patent application Serial No. 707,571 filed January 7, 1958.

Figure 5:
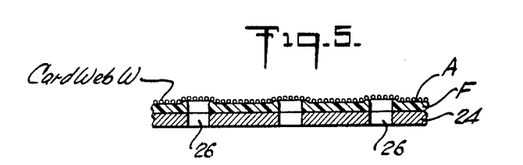
FIGURE 5 is a fragmentary cross-section of a portion of the supporting drum, taken in the direction indicated on line 5—5 of FIGURE 1 and showing the fibrous card web positioned on the perforated non-adherent film.

The supporting drum 24 carries the non-adherent film F past the hot air stream 30 and under a card web W which is delivered from a supply roll 32 over a guide roll 34 and into position on top of the perforated, non-adherent film, as illustrated in FIGURE 5.

Figure 6:
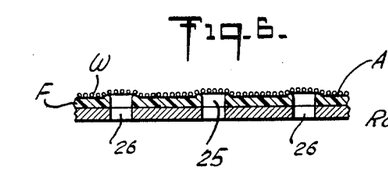
FIGURE 6 is a fragmentary cross section of a portion of the supporting drum, taken in the direction indicated on line 6—6 of FIGURE 1 and showing the fibrous card web lightly adhered to the perforated non-adherent film.

The supporting drum 24 then carries the perforated, non-adherent film F and the card web W positioned thereon past a heating device 36 which is capable of raising the temperature of the water-insoluble, thermoplastic adhesive on the perforated non-adherent film F (or of the perforated film itself, if there is no adhesive coating) to a sufficiently high temperature that the card web is lightly adhered thereto, as illustrated in FIGURE 6.

It is to be noted that the card web W extends substantially over the complete area of the perforated non-adherent film F and that the web is bonded to the film over substantially its complete surface except where the perforations 25 were formed therein by the hot air stream 30.

The supporting drum 24 then carries the card web and the non-adherent film into contact with a fine open-mesh fabric 38 which presses the web and film against the outer surface of the supporting drum 24. As shown in FIGURE 1, the open-mesh fabric 38 is endless and is wrapped around rotatable rollers 37, 39 and 41 which are adjustably positioned so as to maintain proper tension in the open-mesh fabric 38. A flexible material such as a synthetic plastic, notably nylon screen, or a metallic belt such as a Fourdrinier wire used in papermaking, is preferred. Such fabrics are foraminous, flexible and inert to the fluid used in the rearranging process.

The openings in flexible fabric 38 are smaller than the openings 26 in drum 24, as shown, and they may be of the same size as the openings in the flexible, foraminous supporting elements 27a and 237 of the aforementioned Kalwaites Patent No. 2,862,251.

A manifold or header 40 is positioned within the supporting drum 24 and a rearranging fluid, preferably a liquid such as water, is supplied thereto under pressure by means of a conduit 42. Banks of nozzles 44 are provided on the outer surface of the header 40 and the rearranging fluid sprays outwardly therethrough in the form of jets under pressure against the rearranging drum 24.

Figure 7:
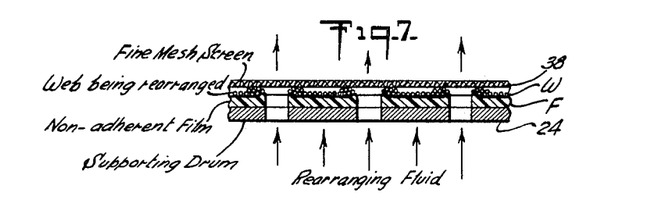
FIGURE 7 is a fragmentary cross-section of a portion of the supporting drum, taken in the direction indicated on line 7—7 of FIGURE 1 and showing the fluid rearranging process in operation.

As shown in FIGURE 7, the rearranging fluid passes successively through the apertures 26 in the supporting drum 24, through the perforated non-adherent film F which is pressed adheringly to the drum 24, through the card web W, and through the fine, open-mesh supporting fabric 38. During this passage, the rearranging fluid moves fabric 38 slightly away from card web W to provide a space in which rearrangement of the fibers in the web W may be effected, and rearranges the fibers of the card web into the configuration of web openings and fiber bundles shown in FIGURES 7 through 9. It is to be observed that the pressure of the rearranging fluid is exerted through the apertures in the drum, through the perforations in the film and against the fine mesh supporting fabric 38. As a result, the supporting fabric 38 bellows out sufficiently to enable enough freedom for the individual fibers to be displaced during their rearrangement. The precise description of this process is more particularly set forth in the abovementioned U.S. Patent 2,862,251. The resulting product, the film with the associated rearranged web, then passes beyond the fine mesh supporting fabric 38 and advances over a conventional suction device 46 to assist in the removal of the rearranging fluid to a desired moisture content in the product.

Figure 9:
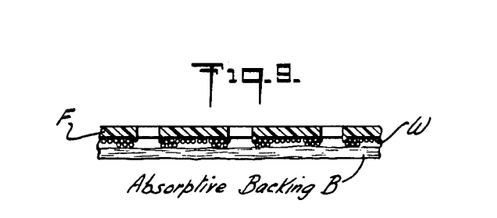
FIGURE 9 is a fragmentary cross-section of a portion of the product resulting from the method and apparatus, said cross-section being taken in the direction indicated on line 9—9 of FIGURE 1 and showing the absorptive backing positioned on the rearranged card web.

The supporting drum 24 then carries the perforated non-adherent film F and the rearranged, lightly adhered web W past conventional heating devices 48 which dry the product, as desired. The dried product is then carried forwardly over a guide roll 50 and leaves the drum 24. An absorbent backing 52 is then delivered from a supply roll 54 over a guide roll 56 to be positioned adheringly on top of the rearranged, lightly adhered, web W, as shown in FIGURE 9. The composite product is then carried forwardly to be wound on supply rolls 58 to be further processed, as desired.

Figures 10, 11:
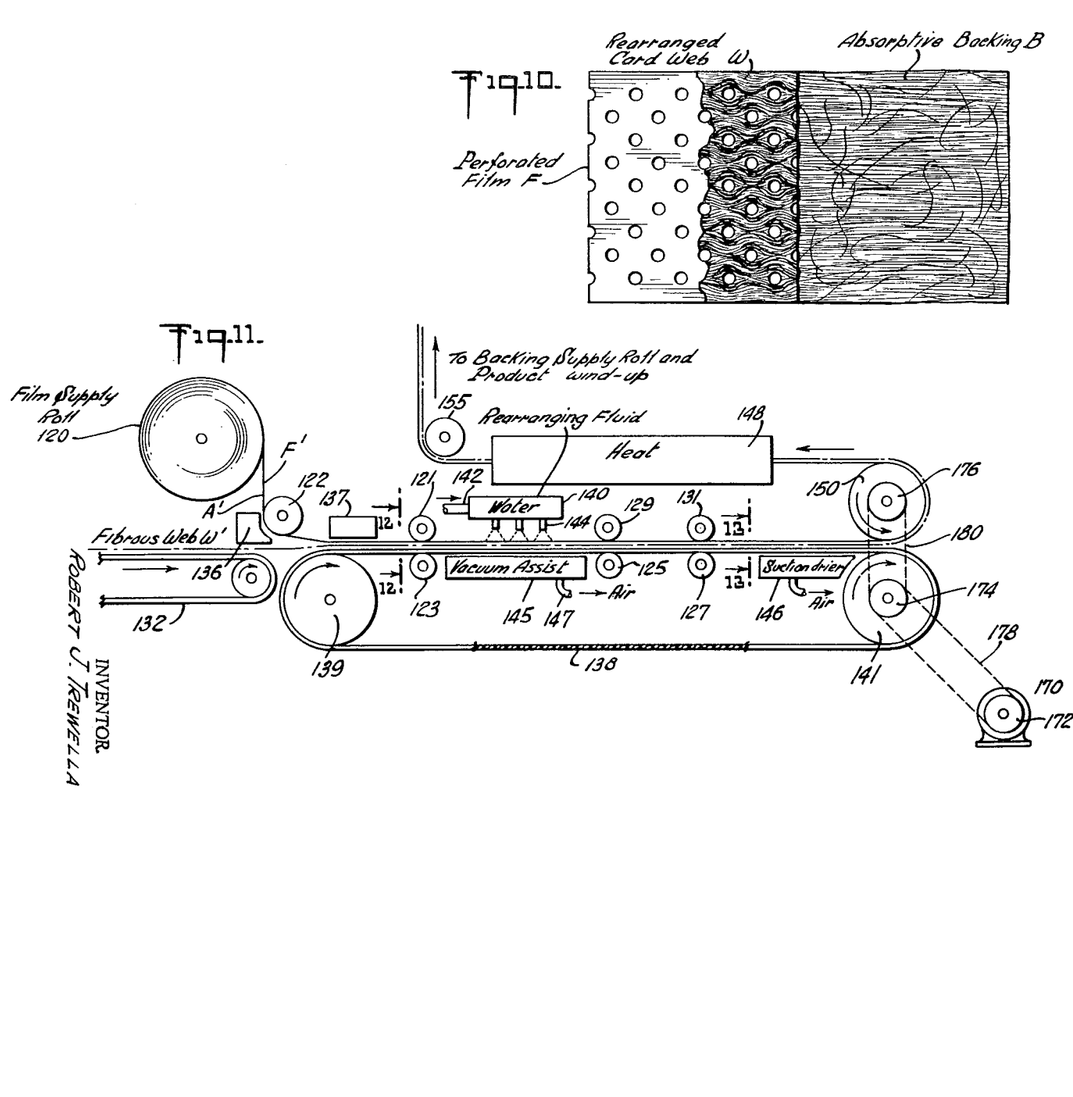
FIGURE 10 is a fragmentary plan view of a portion of the product of the method and apparatus of FIGURE 1, with portions removed to show the construction of the various layers of the product.
FIGURE 11 is a diagrammatic showing in elevation of another embodiment of a method and apparatus for producing the products of the present invention.

In FIGURE 10, there is illustrated a fragmentary, layered illustration of the product as delivered to the product wind-up roll 58 with portions thereof removed to show more clearly the construction of each layer. This figure, taken in conjunction with FIGURE 9, clearly indicates the effectiveness of the spacing element in separating the fibrous absorbent backing from the perforated non-adherent film.

Figure 12:
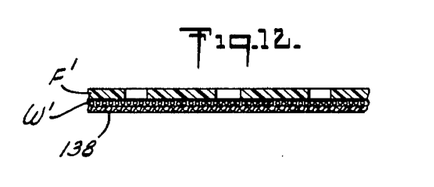
FIGURE 12 is a fragmentary cross-section, in the direction indicated on line 12—12 of FIGURE 11 and showing the card web positioned between the perforated non-adherent film and the foraminous supporting fabric.
Figure 13:
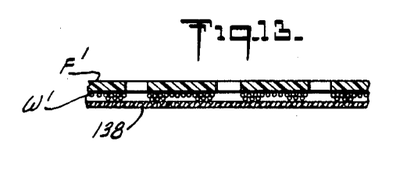
FIGURE 13 is a fragmentary cross-section, taken in the direction indicated on line 13—13 of FIGURE 11 and showing the rearranged card web positioned between the perforated non-adherent film and the foraminous supporting fabric.

It is not essential that a substantially rigid, apertured, facing member, such as the rotatable supporting drum, be used as a component of the fiber rearranging apparatus to receive the direct force and full brunt of the pressurized rearranging fluid used in the rearranging of the fibers of the card web, and to break up this fluid into spaced streams which then pass into and through the web to rearrange the fibers therein. For example, this apertured rigid member may be dispensed with and the perforated film which becomes a component of my novel absorbent dressing, may itself be used to receive the force of the applied fluid and to break up the same into fluid streams spaced some in a direction along the web and others across the web, which then pass through the web to effect the fiber rearrangement. This embodiment of the invention requires films of a thickness and strength capable of withstanding the force of the applied fluid. The method and apparatus of this embodiment are illustrated in FIGURES 11 through 13.

As shown in FIGURE 11, a supply roll 120 of a smooth, flexible, perforated non-adherent film F' suitable for the purposes of the present invention is provided. This film F' is pre-perforated as contrasted to the non-adherent film F of FIGURES 1 through 10 which was not pre-perforated. The film F' is precoated on the underside thereof with a suitable, water-insoluble, thermoplastic adhesive A' and is drawn under tension from supply roll 120 over a rotatable guide roll 122. A brake or other tensioning means may be provided on roll 120 to supply the desired degree of tension to the film F'.

A fibrous card web W' is delivered from a conventional carding machine (not shown) by a conveyor belt 132 to be positioned on a foraminous, flexible, fine mesh fabric 138, such as a nylon screen or a Fourdrinier wire. The fine mesh fabric 138 is endless and is carried on rotatable rollers 139 and 141 and moves from the left to the right, as viewed in FIGURE 11. The perforated film F' is also so moved and is deposited on top of the card web W' at approximately the position contact is made with the fine mesh fabric 138 as it passes over the roll 139.

Movement of the fine mesh fabric 138 carries the contacting fibrous card web W' and perforated film F' past heating devices 136 and 137 which are capable of raising the temperature of the water-insoluble, thermoplastic adhesive (or the perforated film itself, if there is no adhesive coating) to a sufficiently elevated temperature as to render it soft and tacky to bond the card web W' lightly to the perforated film F'. Pressure rollers 121, 129 and 131 are adjustably positioned directly above the perforated film F' and supporting rollers 123, 125 and 127 are adjustably positioned directly below the fine mesh fabric 138 to keep the three-layer sandwich of perforated film F', card web W' and fine mesh fabric 138 in close, contacting relationship.

The fine mesh fabric 138 then carries the perforated film F' and the card web W' into a rearranging zone wherein a header 140, supplied with water under pressure by a conduit 142, sprays water downwardly in the form of jets through nozzles 144 at and through the perforations in the perforated film F' and then through the card web W'. In so doing, the tensioned film F' and the fine mesh fabric separate slightly, due to their difference in tensions and the individual fibers of the card web W' are rearranged to form openings in the fibrous web W' which are surrounded by fiber bundles in very much the same fashion as previously described in connection with the apparatus of FIGURE 1. The type of laminated structure which is formed is basically similar to that illustrated in FIGURE 8.

The perforations in film F' are of a size comparable to the perforations in film F (or the apertures 26 in drum 24), and the openings in fabric 138 are much smaller than the perforations in film F' and they compare in size with the openings in fabric 38.

A vacuum assist 145 is positioned directly below the upper reach of the fine mesh fabric 138 and is connected to a suitable source of vacuum by means of a conduit 147, whereby suction may be applied to the perforated film F' and the card web W' to assist in the passage of the rearranging fluid therethrough.

The laminated structure comprising the perforated film F' and the rearranged web W' is then carried beyond the rearranging zone and passes over a suction dryer 146 which reduces the moisture content in the laminated structure to a desired residual amount. The laminated structure is then carried around a rotatable guide roll 150 and is directed into a heated oven 148 to be dried to any desired degree of dryness. The dried product issuing from the oven is directed around a guide roll 155 and is then led to a product wind-up, or to other processing, as desired.

In FIGURE 12, a cross section of the three-layer sandwich comprising the perforated film F', the lightly adhered fibrous card web W' and the fine mesh fabric 138 is shown prior to the rearranging process.

Figure 8:
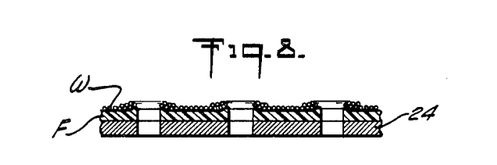
FIGURE 8 is a fragmentary cross-section of a portion of the supporting drum, taken in the direction indicated on line 8—8 of FIGURE 1 and showing the rearranged card web lightly adhered to the perforated non-adherent film.

In FIGURE 13, the three-layer sandwich comprising the perforated film F', the lightly adhered rearranged fibrous web W' and the fine mesh fabric 138 are shown. The formation of the openings in the rearranged web W' is to be noted as well as the accumulation or bundling of the individual fibers which are immediately adjacent to these openings. The relationships and analogies of FIGURE 12 to FIGURE 6, and of FIGURE 13 to FIGURE 8, are to be noted.

The rotatable rollers 139 and 141 in FIGURE 11, as well as the supporting drum 24 of FIGURE 1, and other carrying means illustrated herein, may be driven by any desired conventional means. One example of such a driving means is shown in FIGURE 11 wherein a driving motor 170 drives the rotatable rolls 141 and 150 by means of pulleys 172, 174 and 176 and belts 178 and 180.

The invention will be further illustrated in greater detail by the following specific examples. It should be understood, however, that, although these examples may describe in particular detail some of the more specific features of the invention, they are given primarily for purposes of illustration and the invention in its broader aspects is not to be construed as limited thereto.

EXAMPLE I

The principles illustrated in the apparatus and method of FIGURE 1 are carried out as follows:

The non-adherent film is type 35C "Mylar" film (a polyethylene terephthalate polyester resin), having a thickness of 0.00025 inch (¼ mil) and a softening temperature in excess of 300° F. The water-insoluble, thermoplastic adhesive is "du Pont #4695" having a softening and sticking temperature below 300° F. The adhesive is applied to only one side of the film in an amount of approximately 2 pounds per 3000 square feet of film and is dried by evaporation of solvent. The non-adherent film is passed through a heated air perforating device and is perforated with $\frac{1}{16}$ inch diameter circular perforations in a pattern containing about 72 perforations per square inch in a staggered pattern, in conformity with the size, shape and arrangement of perforations in drum 24.

The fibrous sheet is a card web weighing about 370 grains per square yard and comprises 50% by weight of cotton and 50% by weight of extra dull viscose rayon having a staple length of about $1\frac{9}{16}$ inches and a denier of about 1½.

The fibrous sheet is lightly adhered to the "Mylar" film by passage through a heating zone and the 2-layered laminated structure is then passed through the fluid rearranging zone. The rearranging fluid is water and it passes, in succession, through the apertured facing member, through the perforated, non-adherent film containing perforations in registry with the apertures of the facing member, then through the fibrous web, rearranging the individual fibers in so doing, and finally through the supporting foraminous, fine mesh monofilament nylon fabric (92 x 104). The water pressure is about 40 pounds per square inch gauge and the water is released through nozzles having rectangular openings about $\frac{1}{32}$ inch wide and $\frac{5}{16}$ inch long. The jets of water force aside the fibers in the fibrous web and create openings in the web surrounded by fiber bundles, such as illustrated in FIGURE 7. Conventional vacuum dewatering devices and heating means (temperature about 212° F.) are used to remove the rearranging water from the associated film and rearranged web and to dry the same after the same pass through the rearranging zone.

An absorbent backing of cotton is then applied adheringly to the rearranged fibrous web and the resulting product, illustrated in FIGURE 9, is ready for further processing, as desired. The final product, when sterilized, is useful as a wound dressing. It is capable of satisfactory use and is removable without tearing loose any part of the crust or scab which formed from the secretions from the wound.

Consideration of FIGURES 9 and 10 reveals the effectiveness of the fibrous web in spacing the non-adherent film from the absorptive backing. The openings in the fibrous web are in substantially complete registry with the perforations in the non-adherent film and there is substantially no tendency of the fibers of the fibrous web or of the absorptive backing to stray into the perforations of the non-adherent film. There is very little "fuzzing," very few short fibers, and the dressing is comparatively lint-free.

Removal of the non-adherent dressing for redressing or other purposes is thus rendered very easy since there are substantially no threads or fibers in the crust or scab on the wound. These desirable results are even further increased by the fact that the fibers of the fibrous spacing element are bundled around the openings and perforations whereby greater thickness, greater weight per unit area and increased spacing effect are obtained by a relatively light weight web.

EXAMPLE II

The procedures of Example I are followed substantially as set forth therein except that two fibrous webs are used. One sample (a) contains 100% cotton and the other sample (b) contains 100% extra dull viscose rayon having a staple length of about 1 9/16 inches and a denier of about 1½. The resulting absorbent products of (a) and (b) are commercially acceptable and are comparable to the absorbent product of Example I.

EXAMPLE III

The procedures of Example I are followed substantially as set forth therein except that three different weight coatings for the "Mylar" film are used. One sample is coated with (a) 1½ pounds of adhesive per 3000 square feet of film; the second sample (b) has 3 pounds of adhesive per 3000 square feet of film; and the third sample (c) has 5 pounds of adhesive per 3000 square feet of film. The absorbent products resulting from (a), (b) and (c) are acceptable and are comparable to the absorbent product of Example I.

EXAMPLE IV

The procedures of Example I are followed substantially as set forth therein except that three different weights of the fibrous web are used. One (a) weighs 300 gains per square yard; the second (b) weighs 450 grains per square yard, and the third (c) weighs 550 grains per square yard. The resulting absorbent products of (a), (b) and (c) are satisfactory and are comparable to the absorbent product of Example I.

Although several specific examples of the invention have been described, the same should not be construed as limited thereto, nor to the specific features and particular details mentioned therein, but should be considered as including various other equivalent features and details as set forth above and as contemplated by the claims appended hereto. It is understood that any suitable changes, modifications and variations may be made without departing from the spirit and scope of the invention. Thus, for example, a sheet of film material may be applied directly to the absorbent pad material to protect the same. This film is in addition to the film which is intended to be brought into contact with the wound. For further example, web W may be lightly adhered to film F as the assemblage enters the rearranging zone. This may be done by dispensing with heater 36 and providing heat in roller 39. In the claims where this adhering step is recited it is to be understood that these claims are to be construed broadly to cover the adherence of the web or other starting fibrous material to the film either preliminary to the introduction of the assemblage into the rearranging zone or at the threshold to the rearranging zone.

What is claimed is:

1. A method of making an absorbent dressing which comprises: positioning a fibrous starting material the individual fibers of which are capable of movement under the influence of an applied fluid force in contact with a perforated non-adherent film; rearranging the fibers of said fibrous material into a pattern of openings and fiber bundles with the openings in registry with the perforations in said non-adherent film and said fiber bundles extending between and about said openings; and positioning an absorbent pad on the rearranged fibrous material, whereby the absorbent pad is spaced from the non-adherent film by the thickness of the rearranged fibrous material.

2. A method of making an absorbent dressing comprising: positioning a fibrous starting material the individual fibers of which are capable of movement under the influence of an applied fluid force, between and closely adjacent to a smooth, non-adherent, flexible, perforated film and flexible foraminous means having openings therein smaller than the perforations; passing fluid streams simultaneously through the perforations in said film, and the fibrous material and the foraminous means, thereby rearranging the individual fibers of this fibrous material to form openings in the fibrous material in registry with the perforations in the film; and positioning an absorbent pad in contact with said rearranged fibrous material.

3. A method of making an absorbent dressing comprising: positioning a fibrous starting material the individual fibers of which are capable of movement under the influence of an applied liquid force, between and closely adjacent to a smooth, non-adherent, flexible, perforated film and flexible foraminous means having openings therein smaller than the perforations; passing liquid streams simultaneously through the perforations in said film, and the fibrous material and the foraminous means, thereby rearranging the individual fibers of this fibrous material to form openings in the fibrous material in registry with the perforations in the film; and positioning an absorbent pad in contact with said rearranged fibrous material.

4. In a method as defined in claim 3, the improvement wherein the liquid is water.

5. A method of making an absorbent dressing comprising: positioning a fibrous starting material the individual fibers of which are capable of movement under the influence of an applied fluid force between and closely adjacent to a smooth, non-adherent, flexible, perforated film and flexible foraminous means having openings therein smaller than the perforations; lightly adhering said fibrous material to said perforated film without destroying the aforesaid capability of movement; passing fluid streams simultaneously through the perforations in said film, through the fibrous material and through the foraminous means, thereby rearranging the individual fibers of the fibrous material to form openings in the fibrous material in registry with the perforations in the film; and positioning an absorbent pad in contact with said rearranged fibrous material.

6. A method of making an absorbent dressing comprising: positioning a fibrous starting material the individual fibers of which are capable of movement under the influence of an applied fluid force between and closely adjacent to a smooth, non-adherent, flexible, perforated film and flexible foraminous means having openings therein smaller than the perforations; lightly adhering said fibrous material to said perforated film without destroying the aforesaid capability of movement; passing liquid streams simultaneously through the perforations in said film, through the fibrous material and through the foraminous means, thereby rearranging the individual fibers of the fibrous material to form openings in the fibrous material in registry with the perforations in the film; drying said rearranged fibrous material and perforated film; and positioning an absorbent pad in contact with said rearranged fibrous material.

7. A method of making an absorbent dressing comprising: positioning a layer of a fibrous starting material the individual fibers of which are capable of movement under the influence of an applied fluid force in contact with a perforated non-adherent film; supporting the said assemblage on a perforated supporting member with the film in contact with the supporting members and with the perforations in said film in registry with the perforations in the supporting member; lightly adhering said fibrous layer to said perforated film without destroying the aforesaid capability of movement; moving the supporting member and the said assemblage without relative movement therebetween into the path of a fluid impelled under an applied force whereby spaced fluid streams pass simultaneously through the perforations in said supporting member and then through the perforations in said film and into and through the said fibrous layer; while the said fluid is passing through the said perforations and fibrous layer, providing a flexible foraminous means having openings therein smaller than the aforesaid perforations closely adjacent to said fibrous layer in the region where said fluid is passing through said fibrous layer so that rearrangement of the fibers in said fibrous layer is effected without destruction of said layer to provide openings in the fibrous layer in registry with the said perforations; passing the assemblage of film and rearranged fibrous material from the region of rearrangement; and positioning an absorbent pad in contact with said rearranged fibrous material.

8. A method of making an absorbent dressing comprising: positioning a layer of a fibrous starting material the individual fibers of which are capable of movement under the influence of an applied fluid force in contact with a perforated non-adherent film; supporting the said assemblage on a perforated supporting member with the film in contact with the supporting members and with the perforations in said film in registry with the perforations in the supporting member; lightly adhering said fibrous layer to said perforated film without destroying the aforesaid capability of movement; moving the supporting member and the said assemblage without relative movement therebetween into the path of a liquid impelled under an applied force whereby spaced liquid streams pass simultaneously through the perforations in said supporting member and then through the perforations in said film and into and through the said fibrous layer; while the said liquid is passing through the said perforations and fibrous layer, providing a flexible foraminous means having openings therein smaller than the aforesaid perforations closely adjacent to said fibrous layer in the region where said liquid is passing through said fibrous layer so that rearrangement of the fibers in said fibrous layer is effected without destruction of said layer to provide openings in the fibrous layer in registry with the said perforations; passing the assemblage of film and rearranged fibrous material from the region of rearrangement; drying said assemblage; and positioning an absorbent pad in contact with said rearranged fibrous material.

9. A method of making an absorbent dressing comprising: positioning a non-adherent film on a perforated supporting member; perforating the film to provide perforations therein in registry with the perforations in the supporting member; positioning a layer of a fibrous starting material the individual fibers of which are capable of movement under the influence of an applied fluid force in contact with the perforated film; lightly adhering said fibrous layer to said perforated film without destroying the aforesaid capability of movement; moving the supporting member and the assemblage of the film and the fibrous layer without relative movement between the supporting member and the assemblage into the path of a fluid impelled under an applied force whereby spaced fluid streams pass simultaneously through the perforations in said supporting member and then through the perforations in said film and into and through the said fibrous layer; while the said fluid is passing through the said perforations and fibrous layer, providing a flexible foraminous means having openings therein smaller than the aforesaid perforations closely adjacent to said fibrous layer in the region where said fluid is passing through said fibrous layer so that rearrangement of the fibers in said fibrous layer is effected without destruction of said layer to provide openings in the fibrous layer in registry with the said perforations; passing the assemblage of film and rearranged fibrous material from the region of rearrangement; and positioning an absorbent pad in contact with said rearranged fibrous material.

10. A method of making an absorbent dressing comprising: positioning a non-absorbent film on a perforated supporting member; perforating the film to provide perforations therein in registry with the perforations in the supporting member; positioning a layer of a fibrous starting material the individual fibers of which are capable of movement under the influence of an applied fluid force in contact with the perforated film; lightly adhering said fibrous layer to said perforated film without destroying the aforesaid capability of movement; moving the supporting member and the assemblage of the film and the fibrous layer without relative movement between the supporting member and the assemblage into the path of a liquid impelled under an applied force whereby spaced liquid streams pass simultaneously through the perforations in said supporting member and then through the perforations in said film and into and through the said fibrous layer; while the said liquid is passing through the said perforations and fibrous layer, providing a flexible foraminous means having openings therein smaller than the aforesaid perforations closely adjacent to said fibrous layer in the region where said liquid is passing through said fibrous layer so that rearrangement of the fibers in said fibrous layer is effected without destruction of said layer to provide openings in the fibrous layer in registry with the said perforations; passing the assemblage of film and rearranged fibrous material from the region of rearrangement; drying said assemblage; and positioning an absorbent pad in contact with said rearranged fibrous material.

References Cited by the Examiner
UNITED STATES PATENTS

| | | | |
|---|---|---|---|
| 1,608,727 | 11/1926 | Dickey | 156—253 |
| 1,978,620 | 10/1934 | Brewster | 156—253 |
| 2,538,899 | 1/1951 | Dodge et al. | 156—253 |
| 2,862,251 | 12/1958 | Kalwaites | 161—169 |
| 3,012,918 | 12/1961 | Schaar | 156—252 |
| 3,068,547 | 12/1962 | L'Hommedien | 161—112 |

EARL M. BERGERT, *Primary Examiner.*